(12) United States Patent
Sengiku et al.

(10) Patent No.: US 8,657,033 B2
(45) Date of Patent: Feb. 25, 2014

(54) GRINDER

(75) Inventors: Hitoshi Sengiku, Anjo (JP); Kazuo Muramatsu, Anjo (JP)

(73) Assignee: Makita Corporation, Anjo-Shi (JP)

( * ) Notice: Subject to any disclaimer, the term of this patent is extended or adjusted under 35 U.S.C. 154(b) by 212 days.

(21) Appl. No.: 13/088,848

(22) Filed: Apr. 18, 2011

(65) Prior Publication Data

US 2011/0272264 A1 Nov. 10, 2011

(30) Foreign Application Priority Data

May 7, 2010 (JP) ................................. 2010-107501

(51) Int. Cl.
*E21B 10/12* (2006.01)
(52) U.S. Cl.
USPC .......................................... 173/217; 173/213
(58) Field of Classification Search
USPC ................ 173/213, 216, 217; 310/50, 71, 89; 81/54
See application file for complete search history.

(56) References Cited

U.S. PATENT DOCUMENTS

| | | | |
|---|---|---|---|
| 4,370,579 A * | 1/1983 | Kobayashi et al. | 310/50 |
| 5,170,851 A | 12/1992 | Kress et al. | |
| 6,632,128 B2 * | 10/2003 | Berger et al. | 451/358 |
| 7,597,157 B2 * | 10/2009 | Stierle et al. | 173/217 |
| 2007/0264869 A1 * | 11/2007 | Habele et al. | 439/529 |
| 2011/0031825 A1 * | 2/2011 | Sengiku | 310/50 |

FOREIGN PATENT DOCUMENTS

| | | |
|---|---|---|
| EP | A2-1-777-792 | 4/2007 |
| EP | A1-2-090-399 | 8/2009 |
| JP | A-6-233490 | 8/1994 |
| JP | A-2009-154271 | 7/2009 |
| WO | WO-A1-2009/084589 | 9/2009 |

OTHER PUBLICATIONS

Oct. 15, 2013 Extended European Search Report issued European Application No. 11162928.3.

* cited by examiner

*Primary Examiner* — Thanh Truong
*Assistant Examiner* — Nathaniel Chukwurah
(74) *Attorney, Agent, or Firm* — Oliff PLC (57) ABSTRACT

In a grinder, a terminal plate is projectingly provided on an upper surface of a controller. A connection portion, which accommodates a female terminal and includes a slit into which the terminal plate enters, is projectingly provided on a lower surface of a main body portion of a switch block. At the time of assembling of the switch block and the controller, the terminal plate that enters into the connection portion from the slit is inserted into and connected to the female terminal. First and second projections that cover a formation surface of the slit in the connection portion when the connection portion is inserted with and connected to the terminal plate are formed on the upper surface of the controller.

16 Claims, 13 Drawing Sheets

GRINDER

This application claims the entire benefit of Japanese Patent Application Number 2010-107501 filed on May 7, 2010, the entirety of which is incorporated by reference.

BACKGROUND OF THE INVENTION

1. Field of the Invention

The present invention relates to a grinder that rotates and drives a disk-shaped grindstone by a motor.

2. Description of the Related Art

A grinder is capable of grinding a material to be ground by a disk-shaped grindstone that is mounted to a spindle to which the rotation of an output shaft of a motor is transmitted through a rotation transmission mechanism that uses bevel gears or the like. The spindle is forward of a housing that accommodates the motor and projected perpendicular to the output shaft.

When a metal material is ground by this type of grinder, iron powder and the like generated from such grinding is suctioned into the housing along with air for cooling the motor. If the iron powder and the like accumulate in plug/socket type terminals (e.g., accumulate between a motor terminal and a switch terminal) that connect a pair of internal electronic components, there is a risk of an electrical leak or short circuit.

Therefore, electronic components may be connected through lead wiring without depending on plugs and sockets in order to prevent electrical leaks and the like. However, this requires more time for assembly and also increases costs.

Hence, as illustrated in Japanese Patent Application Publication No. JP-2009-154271A, the applicant for the present application provides an invention in which a housing includes a motor terminal that is disposed on a stator of a motor; and a hollow cylindrical member that is fitted from an opposing direction with a switch terminal disposed on a switch block that includes a switch, whereby a plug/socket type of connection is performed inside the cylindrical member to obtain dust resistance of a terminal connection portion.

A grinder uses a controller that is an electronic component to achieve shifting, braking, and other functions. Because there are cases in which the controller is assembled to a switch block at a rear portion of the housing, there should be dust resistance between the terminals of the controller and the switch block. However, the invention of JP-2009-154271A requires interposing the cylindrical member between two electronic components, as well as the formation of an insertion portion that is inserted into the cylindrical member and holds the terminals. Therefore, the invention is difficult to employ between a switch block and a controller assembled in a narrow space at the housing rear portion.

SUMMARY OF THE INVENTION

In view of the foregoing issue, the present invention provides a grinder capable of achieving suitable dust resistance between terminals of a switch block and a controller even in a narrow space.

To achieve the above, a grinder according to a first aspect of the present invention includes: a cylindrical housing that accommodates a motor; a switch block that is assembled to a rear portion of the housing, and includes a switch that turns driving of the motor on and off; a controller that is assembled to the switch block, and includes a control circuit of the motor; a male terminal that is projectingly provided on one assembling surface of one of the switch block and the controller; a connection portion that is projectingly provided on the other assembling surface of the switch block and the controller, and accommodates a female terminal and includes an entry opening of the male terminal, wherein at the time of assembling of the switch block and the controller, the male terminal that enters from the entry opening is inserted into and connected to the female terminal; and a closing portion that is formed on the one assembling surface, and covers at least a formation surface of the entry opening of the connection portion with the male terminal in an inserted and connected state.

According to a second aspect of the present invention, in the grinder of the first aspect, the controller may be provided with a controller terminal that is electrically connected to the motor side through the switch block, and the switch block may be provided with a positioning portion that positions the controller terminal at a position of connection with the motor side at the time of assembling of the controller.

According to a third aspect of the present invention, in the grinder of the second aspect, the positioning portion may be formed as a cylinder through which the controller terminal runs.

According to a fourth aspect of the present invention, in the grinder of the first aspect, the housing may be formed with a holding portion that suppresses detachment of the switch from the switch block by contacting an outer surface of the switch at the time of assembling of the switch block.

According to a fifth aspect of the present invention, in the grinder of the fourth aspect, the holding portion may be a plate-shaped rib that contacts along the outer surface of the switch.

According to a sixth aspect of the present invention, in the grinder of the first aspect, the closing portion may be a projection that is provided adjacent to the male terminal, and fits to a recessed portion that is provided recessed on the formation surface of the entry opening.

In addition, the switch block and the controller may be assembled by sliding the assembling surface of the controller in parallel from behind to a position opposing the assembling surface of the switch block. The male terminal may be a terminal plate that is projectingly provided parallel to a direction of the sliding. The entry opening of the connection portion may be a slit into which the terminal plate enters while sliding, and formed spanning over two surfaces comprising a surface orthogonal to the other assembling surface of the connection portion and a surface parallel to the other assembling surface, with the recessed portion formed spanning over the two surfaces. The projection may be a first projection that fits to a portion of the recessed portion on the orthogonal surface side, and a second projection that is provided at a base of the terminal plate and fits to a portion of the recessed portion on the parallel surface side.

According to the first aspect, suitable dust resistance can be achieved between the terminals of the switch block and the controller assembled in a narrow space. The connection operation can thus employ a simple insertable connection so that the assembly operation can be performed in a short time at low cost.

According to the second aspect, in addition to the effect of the first aspect, even with the switch block interposed therebetween, the controller terminal can be electrically connected to the motor side in a precise and reliable manner. In particular, reliable positioning can be performed if the positioning portion is a cylinder as described in the third aspect.

According to the fourth aspect, in addition to the effect of the first aspect, an efficient structure is achieved in which the switch is automatically held in the assembled state of the switch block. In particular, the holding portion can be easily obtained if the holding portion is a rib as described in the fifth aspect.

According to the sixth aspect, in addition to the effect of the first aspect, inter-terminal dust resistance is made possible with a minimal structure that requires few design changes.

BRIEF DESCRIPTION OF THE DRAWINGS

FIGS. 3A to 3C are perspective views of a switch block, wherein

FIGS. 4A and 4B are perspective views of a controller, wherein

FIGS. 5A to 5C are perspective views of the controller assembled to the switch block, wherein

FIGS. 6A to 6C are explanatory diagrams of the switch block assembled with the controller, wherein

FIGS. 8A and 8B are perspective views of the motor housing assembled with the switch block, wherein

FIGS. 10A and 10B are explanatory diagrams that show a modification of the assembly structure of the switch block and the controller, wherein

FIGS. 13A and 13B are explanatory diagrams of the switch block assembled with the controller according to a modification, wherein

DETAILED DESCRIPTION OF THE EMBODIMENTS

Hereinafter, embodiments of the present invention will be described on the basis of the drawings.

Figure 1:
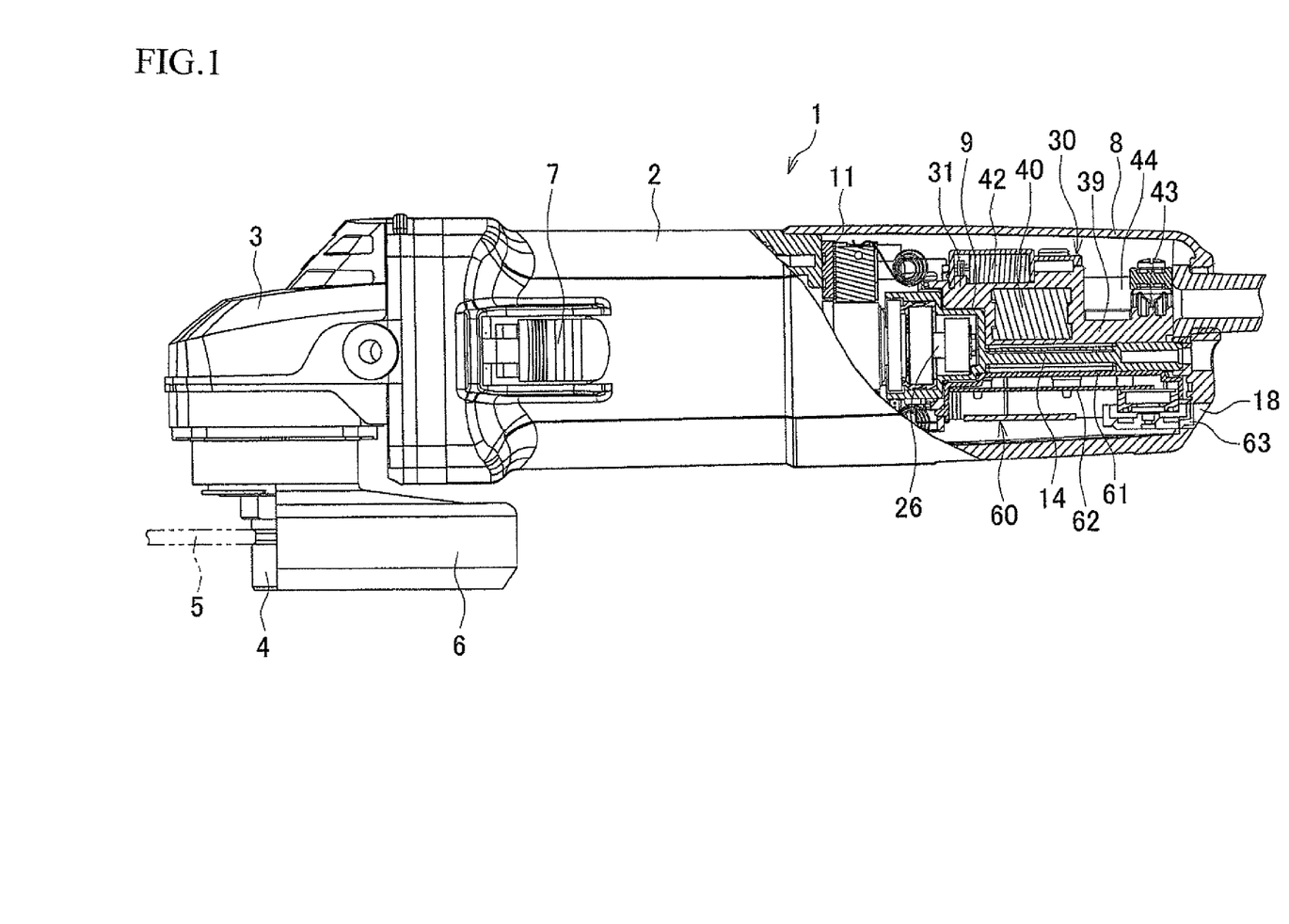
FIG. 1 is a side view of a grinder (whose rear portion is shown in a cross-sectional view)

FIG. 1 shows an example of a grinder. In a grinder 1, a gear housing 3 that is therein provided with a rotation transmission mechanism (not shown) that uses bevel gears and the like is assembled to the front of a cylindrical motor housing 2 that accommodates a motor described later. A spindle 4 projects below the gear housing 3, and a disk-shaped grindstone 5 is orthogonally connected to a lower end of the spindle 4. Reference numeral 6 denotes a grindstone cover that is assembled to a lower surface of the gear housing 3 and covers a rearward portion of the grindstone 5. Reference numeral 7 denotes a slide button that is provided on a side surface of the motor housing 2, and reference numeral 8 denotes a bottomed cylindrical rear cover that is coaxially assembled to a rear end of the motor housing 2.

Figure 2:
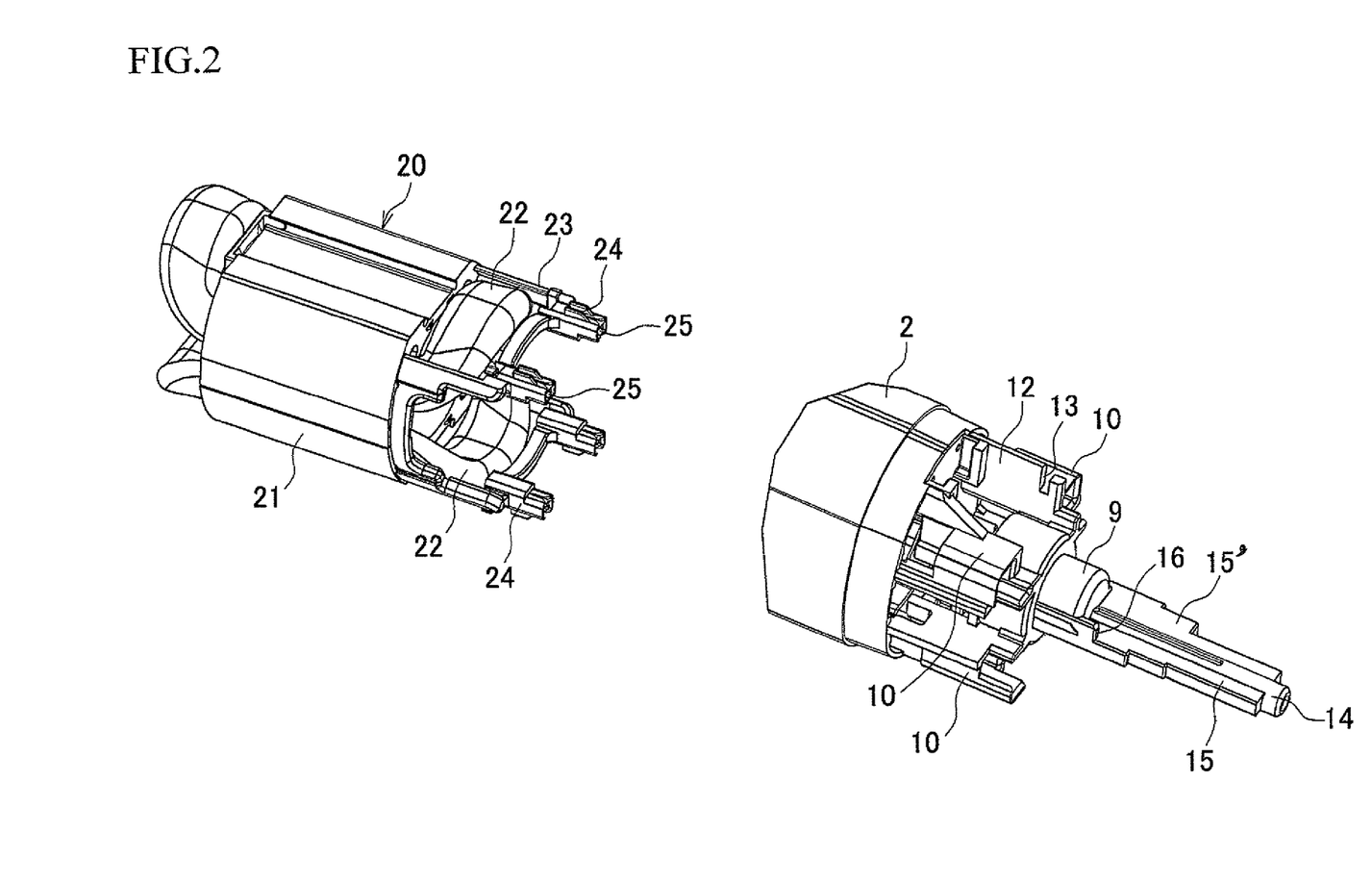
FIG. 2 is a perspective view of a stator of a motor and a motor housing (rear portion only)

As shown in FIG. 2, a bearing portion 9 that projects into the rear cover 8 and axially supports a rear end of an armature 26 of the motor is integratedly formed at the rear of the motor housing 2. Around the bearing portion 9, four guide ribs 10 shaped as rectangular cylinders are disposed parallel to an axis line of the motor housing 2. A pair of brush holders 11, 11 are provided between the guide ribs 10, 10 at positions symmetrical about a point centered on the bearing portion 9. Similarly, upper and lower partition walls 12, 12 that partition the guide ribs 10 and the brush holders 11 from each other at positions symmetrical about a point centered on the bearing portion 9 are each formed with an engagement groove 13 in the up-down direction.

On a rear surface of the bearing portion 9, a screw mounting boss 14 is provided extending toward a rear portion of the rear cover 8 and threadably fixed to a rear surface of the rear cover 8. Left and right side surfaces of the screw mounting boss 14 are connectably provided so as to have a flat plate configuration with reinforcement ribs 15, 15' that hold the screw mounting boss 14 therebetween. In addition, a small rib 16 shaped as a rectangular plate is provided as a holding portion that extends from a left end of the rear surface of the bearing portion 9 to an upper surface of the left reinforcement rib 15.

Figure 3A:
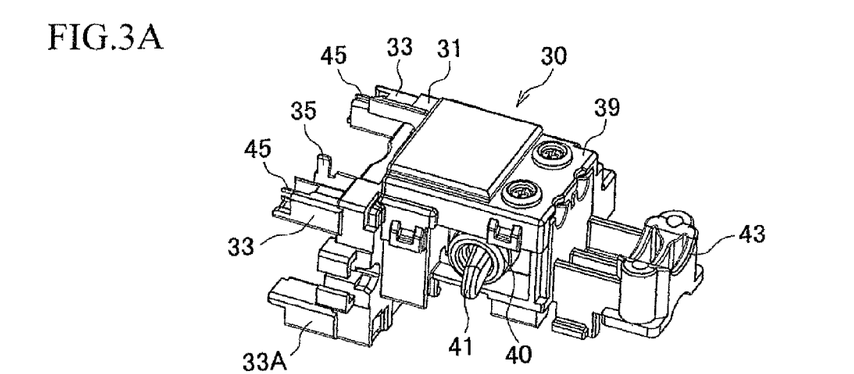
FIG. 3A is a view from the top rear side.
Figure 3B:
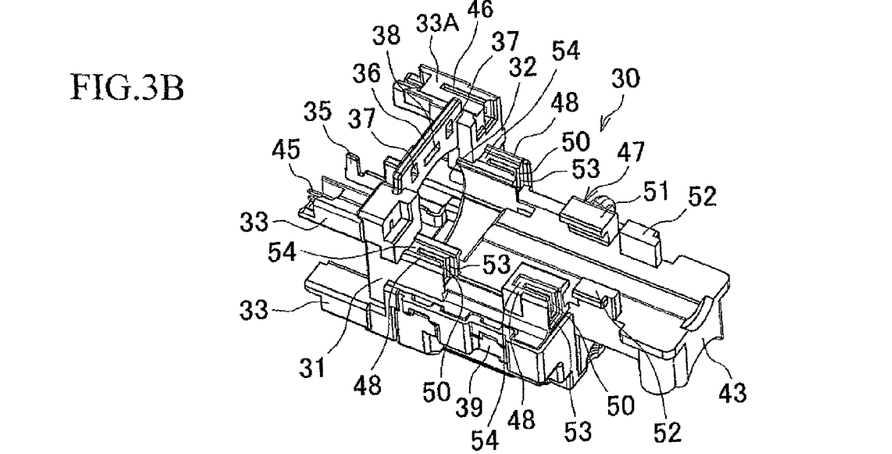
FIG. 3B is a view from the bottom rear side.
Figure 3C:
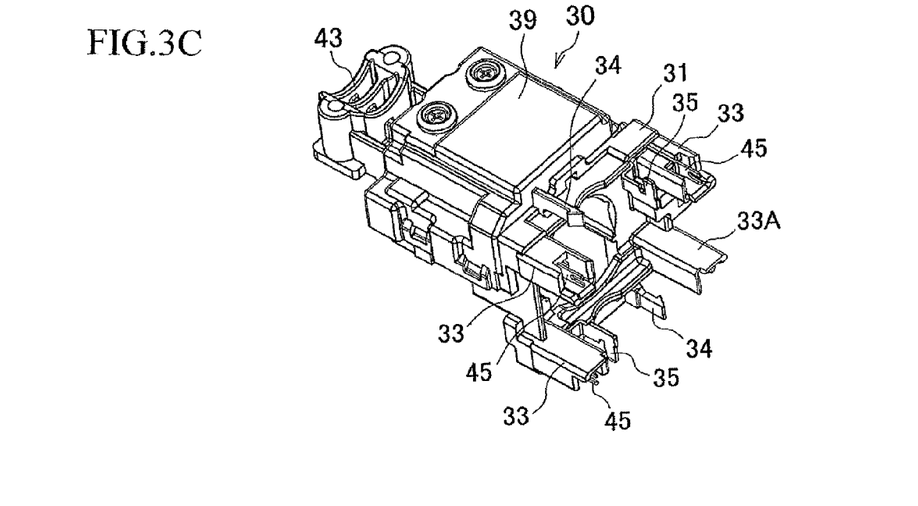
FIG. 3C is a view from the top front side.

The guide ribs 10 correspond to the cylindrical member described earlier in JP-2009-154271A, and each is inserted with and connects female terminals 25 provided on a stator 20 of the motor and male terminals 45 provided on a switch block 30 shown in FIG. 3 with each other. The stator 20 of the motor includes a terminal member 23 that has on a rear end surface thereof an iron core 21 around which coils 22, 22 are wound. The terminal member 23 is integratedly formed with four front insertion portions 24 that respectively accommodate the female terminals 25 connected to the coils 22, 22 and face rearward.

Inserting the stator 20 from a front opening of the motor housing 2 enables the stator 20 to be positioned by contacting a positioning stepped portion (not shown) that is provided on an inner surface of the motor housing 2. At the same time, the front insertion portions 24 are respectively inserted from the front into the corresponding guide ribs 10. By similarly inserting the armature 26 into the stator 20 from the front opening of the motor housing 2, a rear end of the armature 26 is axially supported by the bearing portion 9 as shown in FIG. 1.

Meanwhile, a rear surface of the motor housing 2 inside the rear cover 8 is assembled with the switch block 30. The switch block 30 is a molded component made of synthetic resin. The switch block 30 includes a base portion 31 shaped as a rectangle plate in a frontal view, and the center of a front portion of the switch block 30 is formed with a through-hole 32 into which the bearing portion 9 is fitted. The front of the base portion 31 includes four rear insertion portions 33 that correspond to the guide ribs 10, and a pair of engagement sections 34, 34 that are provided at upper and lower positions symmetrical about a point centered on the through-hole 32 and that engage with the engagement grooves 13 provided in the motor housing 2. Reference numerals 35, 35 each denote a terminal that connects to a brush. A lower side of the base portion 31 is provided with an engagement plate 36 that forms part of the through-hole 32. The engagement plate 36 is formed with a pair of left and right engagement holes 37, 37, and a fitting hole 38 that is located between the two engagement holes 37, 37.

At the rear of the base portion 31, a main body portion 39 that incorporates a switch 40 and a switch board 42 is formed above the through-hole 32, and a lever 41 of the switch 40 projects from a left surface of the main body portion 39. A receiving seat 43 is projectingly provided on a rear end of the main body portion 39, and fixes a power cord 44 that is drawn inside from the rear portion of the rear cover 8.

Further, the rear insertion portions 33 are respectively provided with the male terminals 45 that are respectively inserted with and connected to the female terminals 25 of the stator 20, except for the lower left rear insertion portion (indicated as 33A in order to distinguish from the other rear insertion portions). The rear insertion portion 33A is formed with a through-hole 46 that longitudinally runs through the rear insertion portion 33A. The rear insertion portion 33A serves as a positioning portion of a controller terminal described later.

A lower surface of the main body portion 39 is provided with an assembling seat 47 of a controller 60. As shown in FIG. 3B, the assembling seat 47 includes three connection portions 48 that project downward and are provided at three locations: positions to the left and right of the through-hole 32 along a rear surface of the base portion 31, and a longitudinally center position on the right side of the main body portion 39 between the rear surface of the base portion 31 and the rear of the switch block 30. The connection portions 48 each accommodate a female terminal 49 (shown in FIG. 6) that opens rearward, and rear and lower surfaces of each connection portion 48 are formed with a slit 50 that serves as an entry opening of a terminal plate 67 described later. The assembling seat 47 further includes a receiving projection 51 that is provided projecting to the same height as the connection portion 48 at the longitudinally center position on the left side of the main body portion 39; and reverse L-shaped rail projections 52, 52 that are provided projecting downward on the left and right sides of the main body portion 39 rearward of the receiving projection 51, and whose engagement side faces outward. The rear and lower surfaces of each connection portion 48 that serve as formation surfaces of the slit 50 are recessed portions 53, 54 that are lower than left and right ends of each connection portion 48.

Figure 4A:
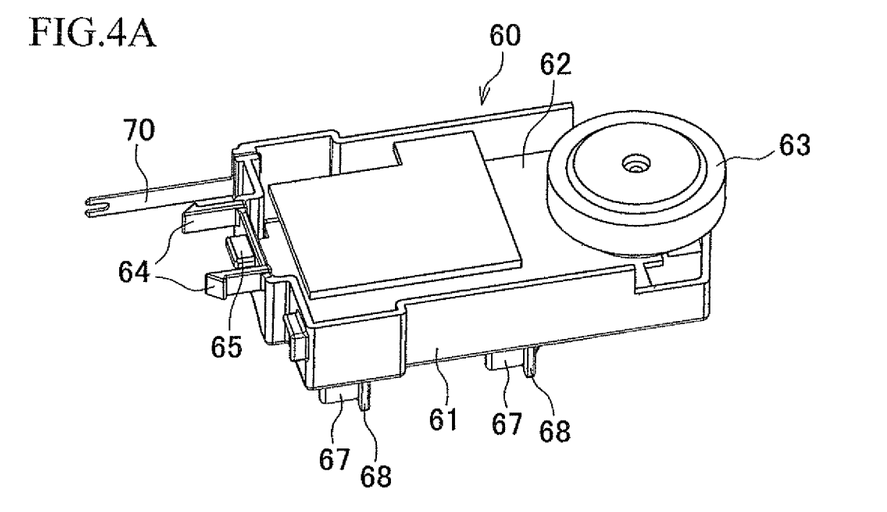
FIG. 4A is a view from below and FIG. 4B is a view from above.
Figure 4B:
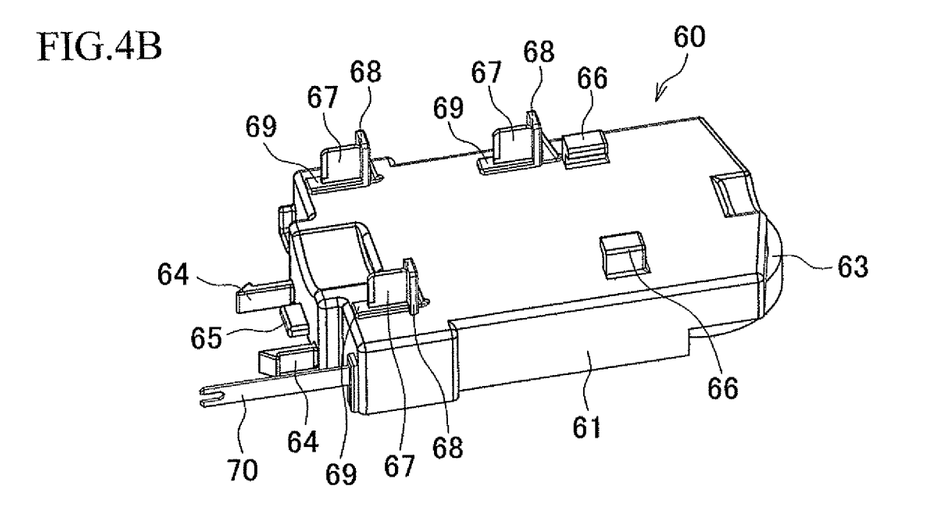

The controller 60 to be assembled here, as shown in FIGS. 4A and 4B, incorporates a substrate 62 that forms a control circuit into a flat rectangular box 61. A rear portion of the box 61 is provided with a speed adjustment dial 63 that partially projects rearward of the box 61. In addition, a front surface of the box 61 includes a pair of left and right hooks 64, 64 that engage with the engagement holes 37, 37 provided on the engagement plate 36 of the base portion 31; and a fitting projection 65 that is positioned between the hooks 64, 64 and inserted into the fitting hole 38 when assembled to the switch block 30. Further, an upper surface of the box 61 is provided with a pair of left and right L-shaped engagement projections 66, 66 that engage from an outer side with the rail projections 52, 52 provided on the assembling seat 47 when assembled to the switch block 30.

Meanwhile, on the upper surface of the box 61, three terminal plates 67 that serve as male terminals from the substrate 62 connected to the switch block 30 are provided longitudinally projecting at positions corresponding to each female terminal 49 of the switch block 30. Here, on a rear portion of each terminal plate 67, a rectangular first projection 68 is projectingly provided adjacent to the terminal plate 67 so as to fit to the recessed portion 53 on the rear surface side of the connection portion 48 of the switch block 30, when the terminal plate 67 and the female terminal 49 are connected. At a base of each terminal plate 67, a rectangular second projection 69 is formed so as to fit to the recessed portion 54 on the lower surface side of the connection portion 48, when the terminal plate 67 and the female terminal 49 are connected.

Reference numeral 70 denotes a controller terminal that projects forward from the left side of the front surface of the box 61, and penetrates the through-hole 46 of the rear insertion portion 33A when assembled to the switch block 30.

Figure 5A:
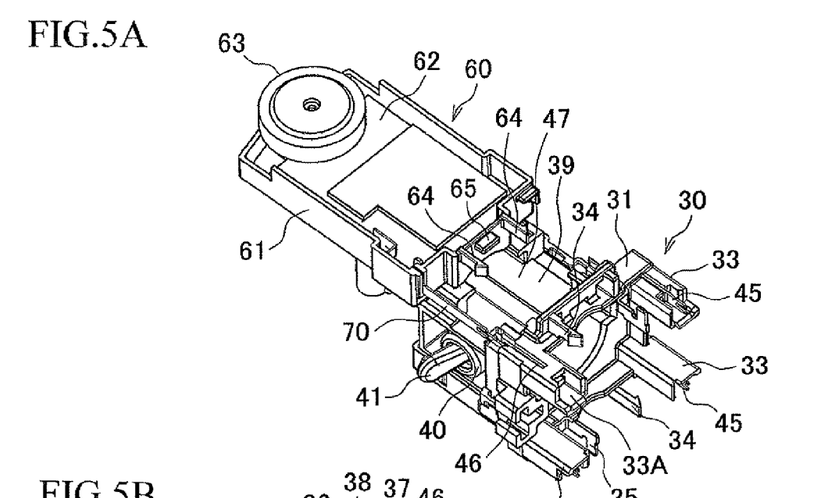
FIG. 5A is a view from the top front side.
Figure 5B:
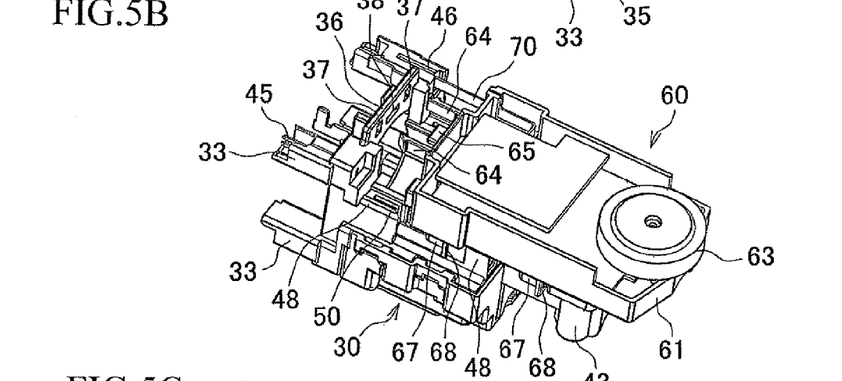
FIG. 5B is a view from the top rear side.
Figure 5C:
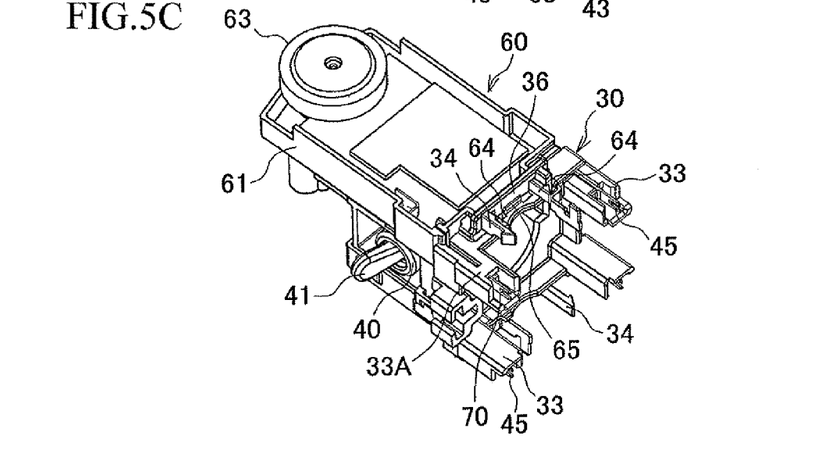
FIG. 5C is a view from the top front side after assembly is complete.
Figure 6A:
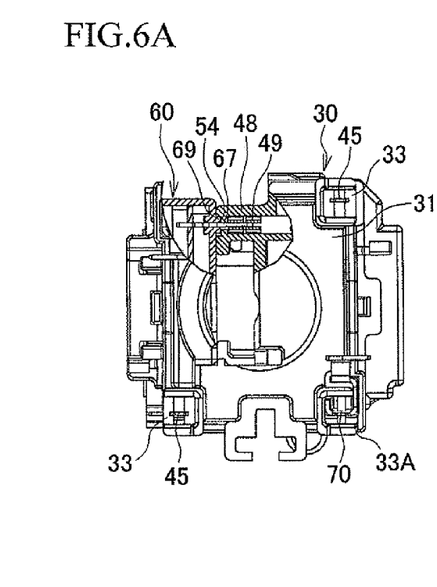
FIG. 6A is a frontal view.
Figure 6B:
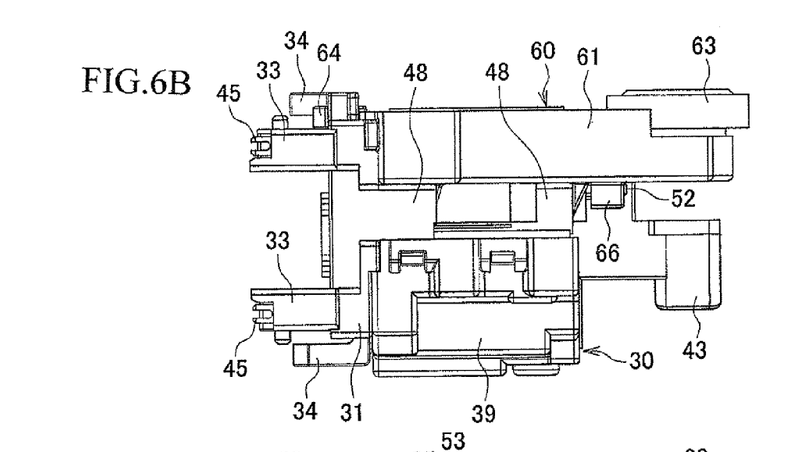
FIG. 6B is a side view.
Figure 6C:
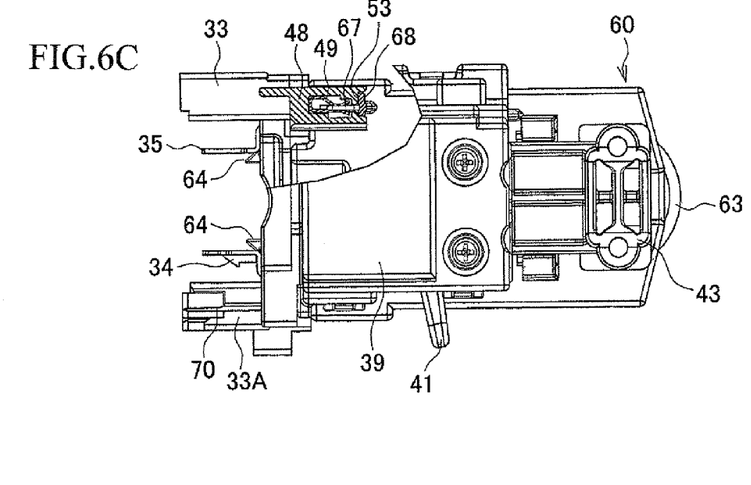
FIG. 6C is a plane view.

In the grinder 1 thus configured as described above, when assembling the switch block 30 and the controller 60 to the motor housing 2, first, the controller 60 is assembled to the switch block 30. In other words, as shown in FIGS. 5A to 5C, with the controller 60 positioned behind the assembling seat 47 of the switch block 30, the corresponding terminal plate 67 is positioned rearward of each connection portion 48. The box 61 is set parallel to the connection portions 48 and an upper surface of the receiving projection 51, and the controller 60 is thus slid forward. Accordingly, as shown in FIGS. 6A to 6C, each terminal plate 67 enters inside the corresponding connection portion 48 from the slits 50, which are on the rear surfaces of the forwardly positioned connection portions 48, and inserted with and connected to the corresponding female terminal 49. In this state, the first projection 68 and the second projection 69 on each terminal plate 67 side are fitted to the recessed portion 53 and the recessed portion 54 of the corresponding connection portion 48, respectively, such that the recessed portions 53, 54 are blocked.

In addition, while this connection is performed, the engagement projections 66, 66 of the box 61 are engaged with the rail projections 52, 52 of the assembling seat 47, and the hooks 64, 64 are engaged with the engagement holes 37, 37 of the engagement plate 36 to insert the fitting projection 65 into the fitting hole 38. Further, the controller terminal 70 runs through the through-hole 46 of the rear insertion portion 33A. Thus, the controller 60 is assembled to the switch block 30 in an electrically connected state.

Figure 7:
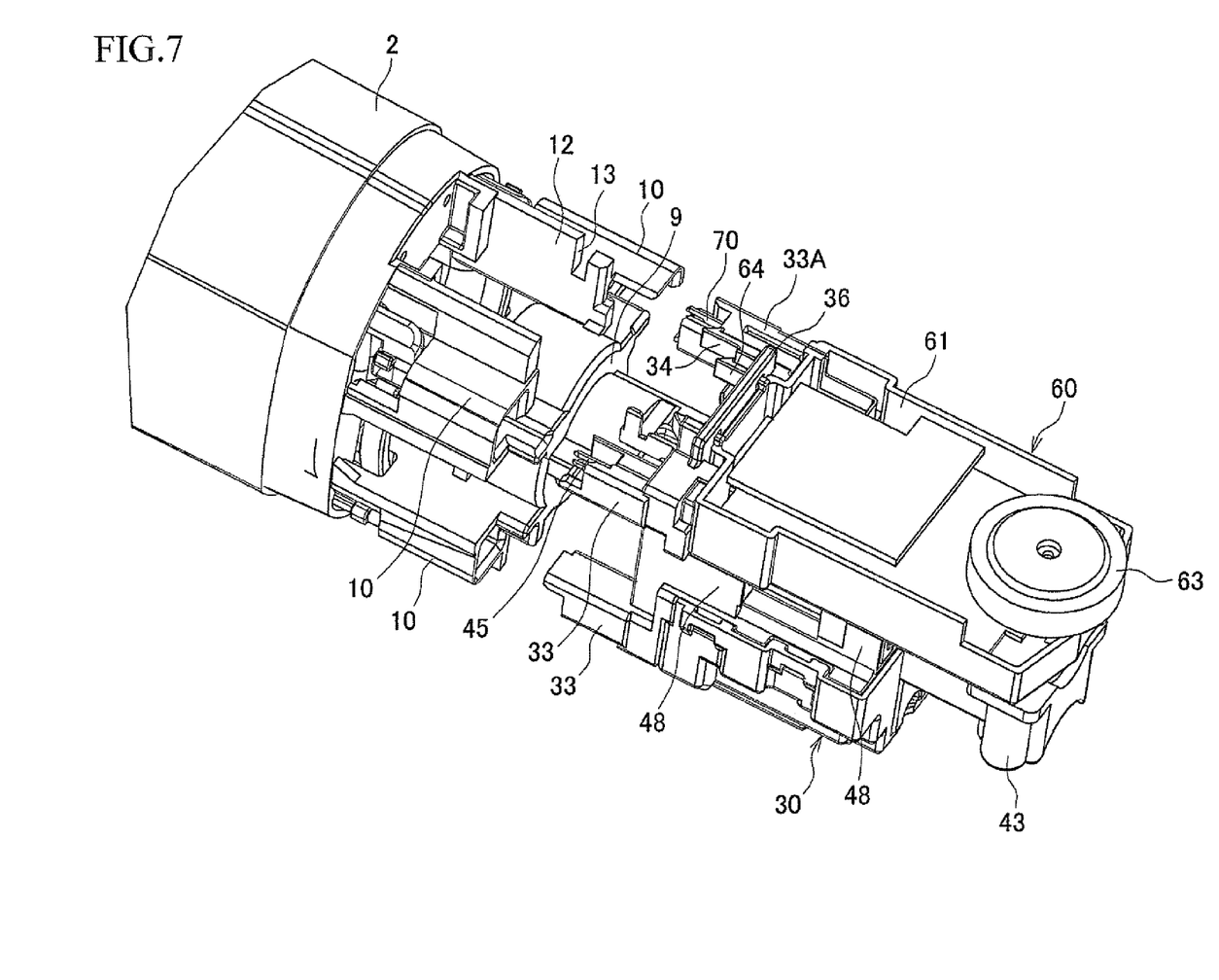
FIG. 7 is a perspective view that shows from below the switch block assembled to the motor housing.
Figure 8A:
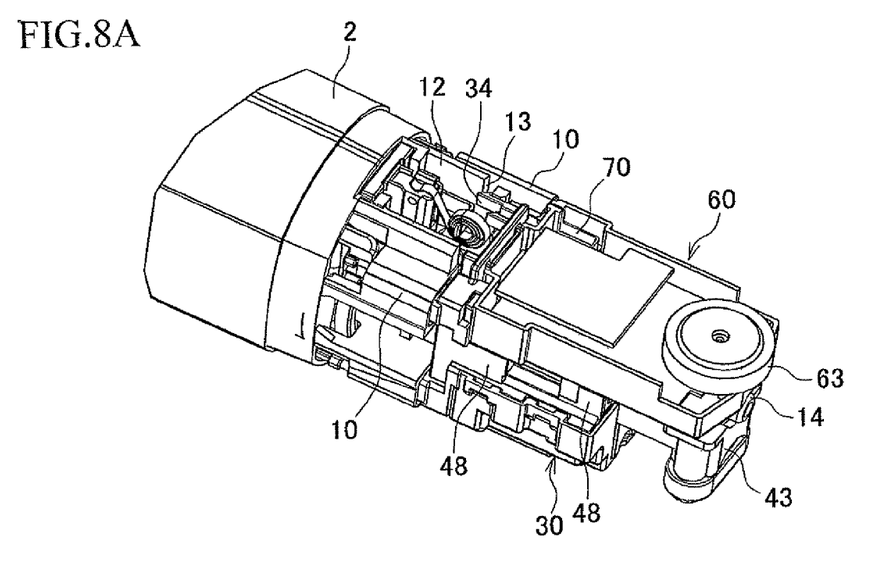
FIG. 8A is a view from below and FIG. 8B is a view from above.
Figure 8B:
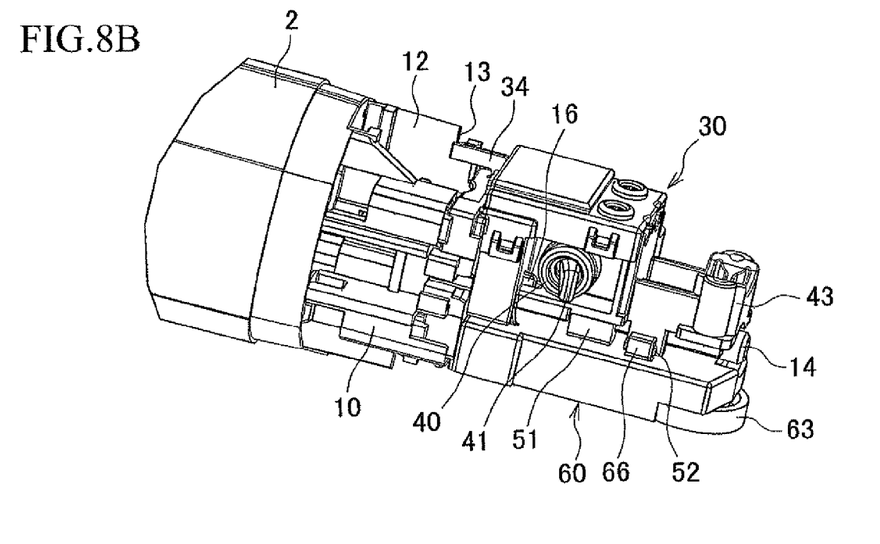

When the switch block 30 thus assembled with the controller 60 is further assembled with the motor housing 2 that accommodates the motor, as shown in FIG. 7, the guide ribs 10 of the motor housing 2 are aligned with the positions of the rear insertion portions 33 of the switch block 30 so that the switch block 30 slides forward. Accordingly, as shown in FIGS. 8A and 8B, the screw mounting boss 14 of the motor housing 2 runs through the through-hole 32 of the switch block 30 and passes between the main body portion 39 and the controller 60. The rear insertion portions 33 are respectively inserted into the guide ribs 10, and the male terminals 45 and the controller terminal 70 are each inserted into and connected to the female terminals 25 on the stator side.

At such time, the small rib 16 provided on the reinforcement rib 15 is positioned on a front surface of the switch 40 and restricts movement in a direction of release from the switch block 30 of the switch 40.

Figure 9:
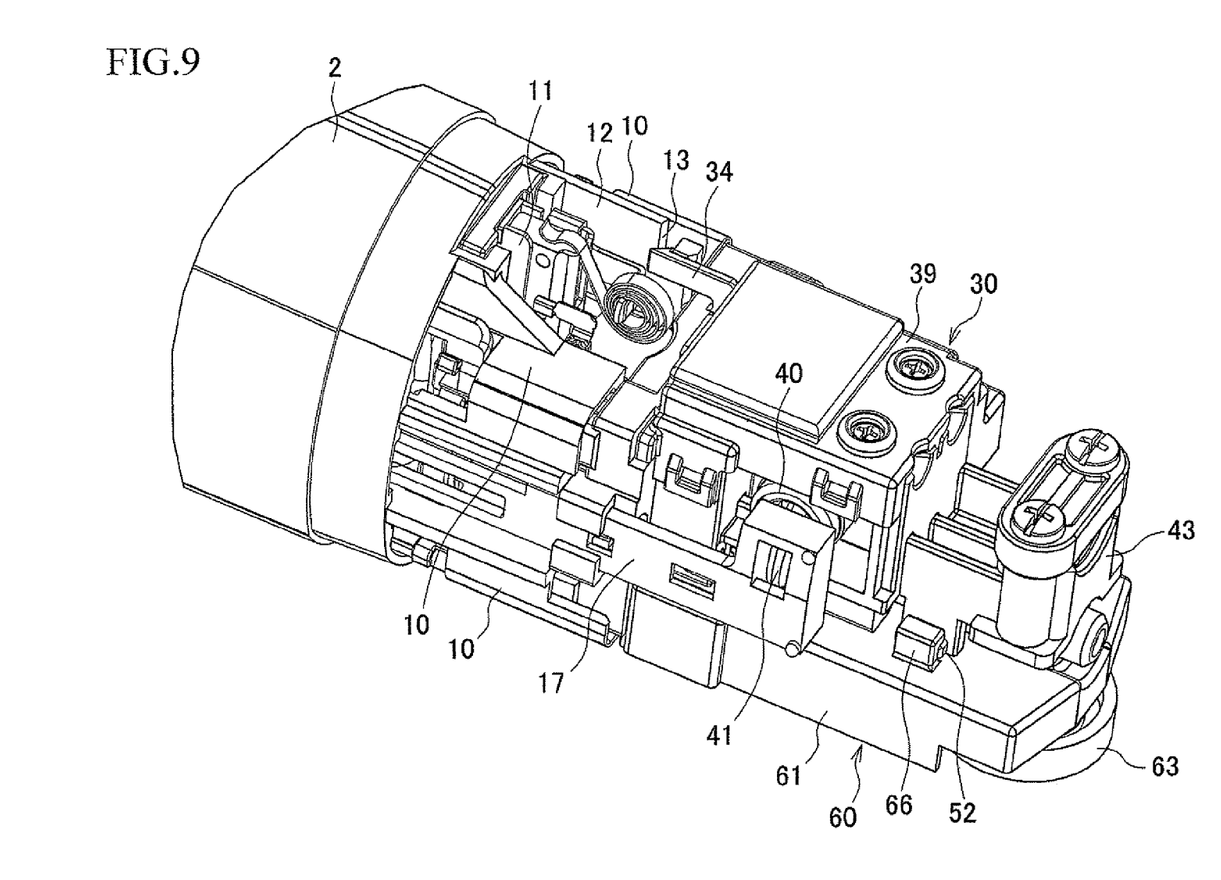
FIG. 9 is a perspective view of the motor housing assembled with the switch block and a switch lever.

As shown in FIG. 9, a slide lever 17 is provided that connects the lever 41 of the switch 40 and the slide button 7. The power cord 44 is connected to the switch block 30, and the rear cover 8 is then assembled. Once a screw (not shown) is threadedly fastened to the screw mounting boss 14, assembly of the grinder 1 as shown in FIG. 1 is complete. In this state, the dial 63 of the controller 60 passes through a window 18 provided at the rear portion of the rear cover 8 so as to be partially exposed.

Thus, according to the grinder 1 of the embodiment described above, the terminal plates 67 are projectingly provided on an upper surface that serves as an assembling surface of the controller 60. The connection portions 48, which accommodate the female terminals 49 and includes the slits 50 into which the terminal plates 67 respectively enter, are projectingly provided on the lower surface of the main body portion 39 that serves as an assembling surface of the switch block 30. At the time of assembling of the switch block 30 and the controller 60, the terminal plates 67 that respectively enter into the connection portions 48 from the slits 50 are inserted into and connected to the female terminals 49. The first and second projections 68, 69 are formed on the upper surface of the controller 60 so as to cover the formation surfaces of the slit 50 in each connection portion 48 when the corresponding terminal plate 67 is in an inserted and connected state. Accordingly, suitable dust resistance can be achieved between the terminals of the switch block 30 and the controller 60 assembled in a narrow space. The connection operation can thus employ a simple insertable connection so that the assembly operation can be performed in a short time at low cost.

In particular, here, the controller 60 is provided with the controller terminal 70 that is electrically connected to the motor side through the switch block 30. The switch block 30 is provided with the rear insertion portion 33A that positions the controller terminal 70 at a position of connection with the motor side at the time of assembling of the controller 60. Therefore, even with the switch block 30 interposed therebetween, the controller terminal 70 can be electrically connected to the motor side in a precise and reliable manner.

In addition, the motor housing 2 is formed with the small rib 16 that prevents detachment of the switch 40 from the switch block 30 by contacting the outer surface of the switch 40 at the time of assembling of the switch block 30. Therefore, an efficient structure is achieved in which the switch 40 is automatically held in the assembled state of the switch block 30.

Further, the first and second projections 68, 69 are used as closing portions that are provided adjacent to each terminal plate 67, and respectively fit to the recessed portions 53, 54 that are provided recessed on the formation surfaces of the slit 50. Accordingly, inter-terminal dust resistance is made possible with a minimal structure that requires few design changes.

Note that, in the embodiment described above, the two projections that serve as closing portions are provided so as to respectively fit to recessed portions provided on the rear and lower surfaces of each connection portion. However, provided that the adhesion between the upper surface of the controller and the lower surface of the connection portion remains high, the projection and the recessed portion that fit together in the up-down direction may be omitted.

In addition, the assembly structure of the switch block and the controller is also not limited to the embodiment described above. Appropriate design changes may be made, such as reversing the upper and lower positions of the controller and the main body portion of the switch block, and providing the rail projections and the engagement projections in a reverse configuration, for example.

Figure 10A:
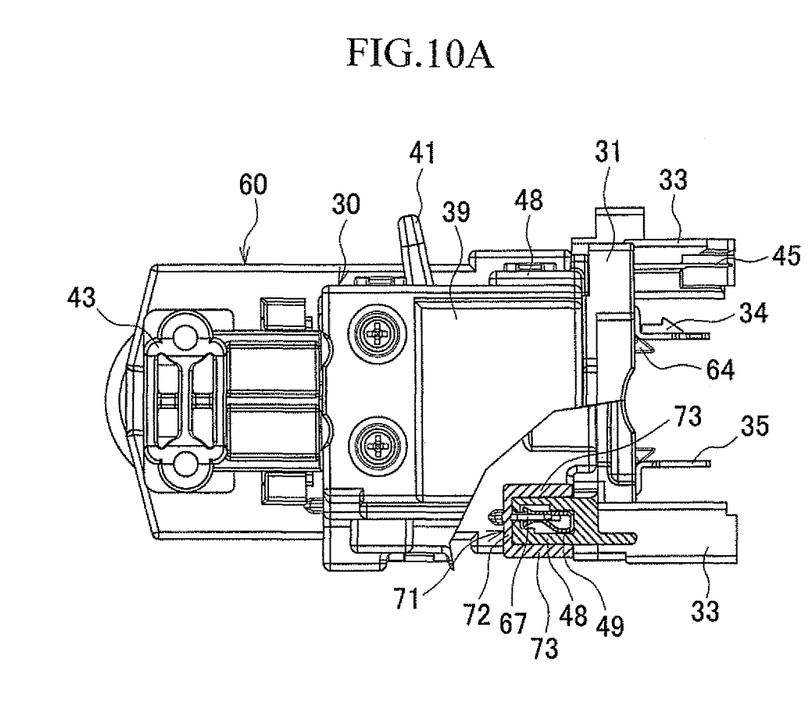
FIG. 10A is a plane view and FIG. 10B is a frontal view.
Figure 10B:
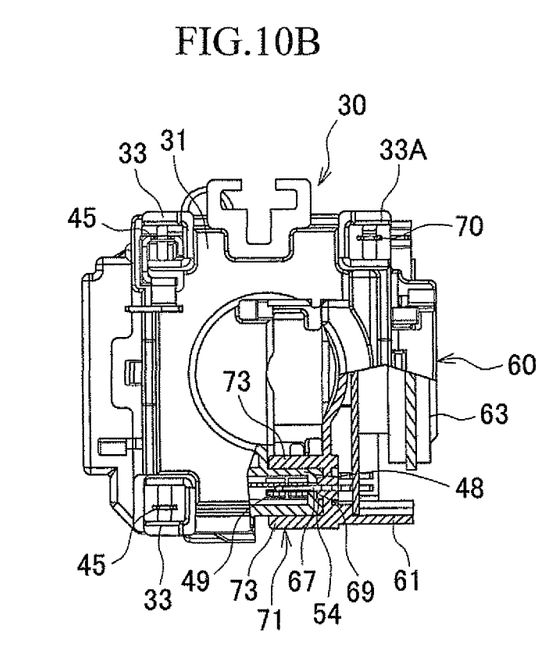
Figure 11A:
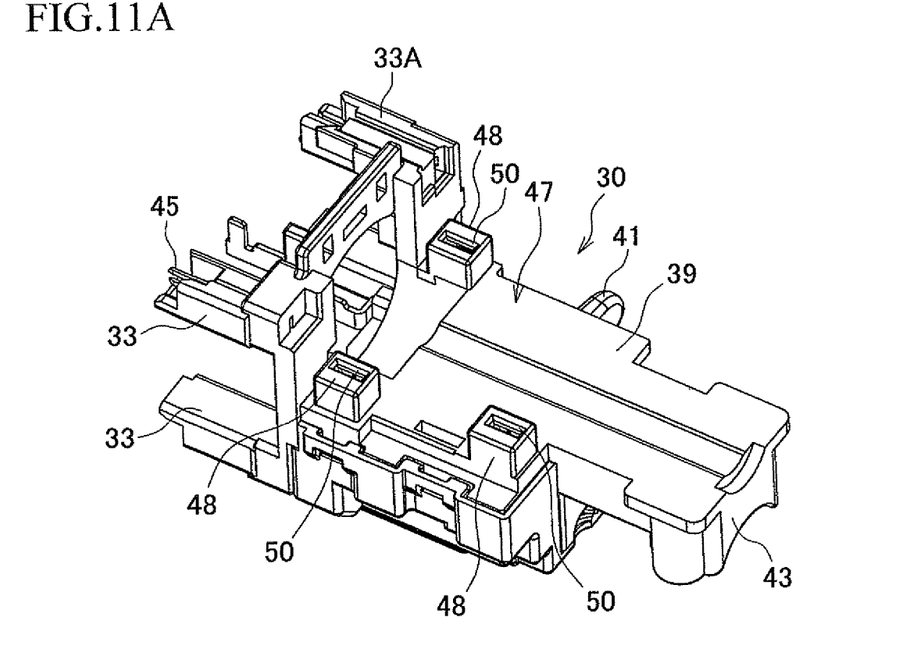
FIG. 11A is a perspective view that shows a modification of the switch block.
Figure 11B:
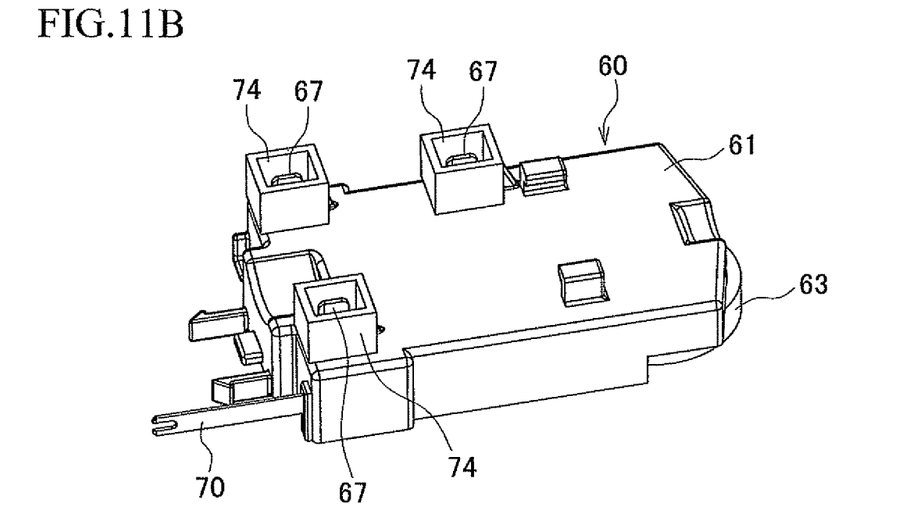
FIG. 11B is a perspective view that shows a modification of the controller.

Further, instead of fitting the recessed portion and the projection on the rear surface side of each connection portion, as shown in FIGS. 10A and 10B, the upper surface of the box 61 of the controller 60 may be provided with a closing portion 71 that is C-shaped in a plane view. The closing portion 71 is formed from a rear plate 72 that is adjacent to a rear end of each terminal plate 67 and contacts a rear surface of the corresponding connection portion 48 when connected to the switch block 30, and a pair of side plates 73, 73 that are provided continuing forward from both ends of the rear plate 72 and contact side surfaces of the corresponding connection portion 48 when connected to the switch block 30. According to this modification, high dust resistance can be obtained because the rear surface as well as the left and right side surfaces of the connection portion 48 are widely covered. Note that although fitting of the recessed portion 54 and the second projection 69 on an upper side of the terminal plate 67 remains unchanged here, this fitting may be omitted and only the closing portion 71 employed.

The direction in which the controller is assembled to the switch block is not limited to sliding in the longitudinal direction as described in the above embodiment. The assembling direction may be a vertical or lateral direction, and the form of the closing portion may be modified in accordance with the assembling direction in such case. For example, FIGS. 11A to 13B illustrate a modification when the controller 60 is assembled to the switch block 30 in the vertical direction. Here, each connection portion 48 that is provided on the assembling seat 47 of the switch block 30 is a rectangular projection that provides the slit 50 on only a lower surface thereof and accommodates the female terminal 49 facing downward. Meanwhile, the periphery of each terminal plate 67 projectingly provided on the upper surface of the controller 60 is provided with a closing portion 74 shaped as a rectangular cylinder. Each closing portion 74 is externally fitted to the corresponding connection portion 48 and covers four surfaces, namely, the front, rear, left, and right surfaces, of the connection portion 48 when assembled to the switch block 30.

Figure 12:
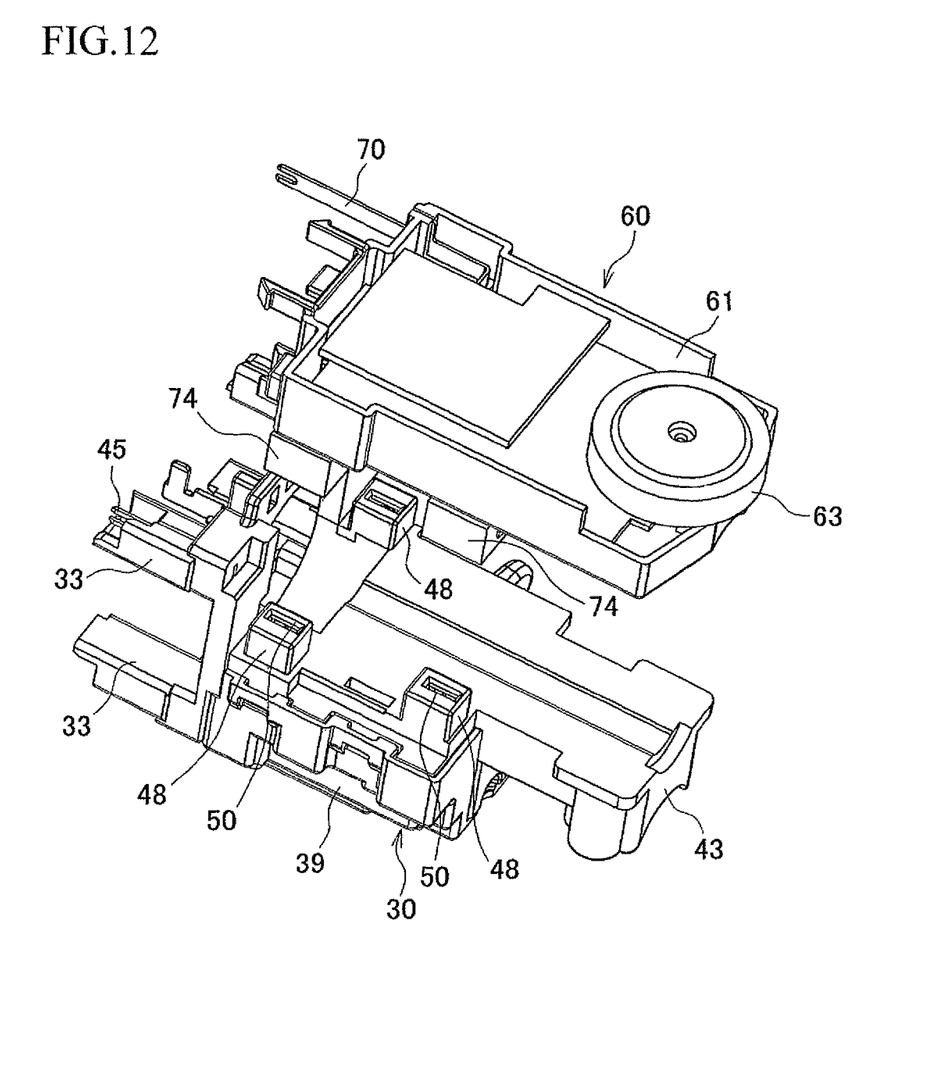
FIG. 12 is a perspective view of the controller assembled to the switch block according to a modification.
Figure 13A:
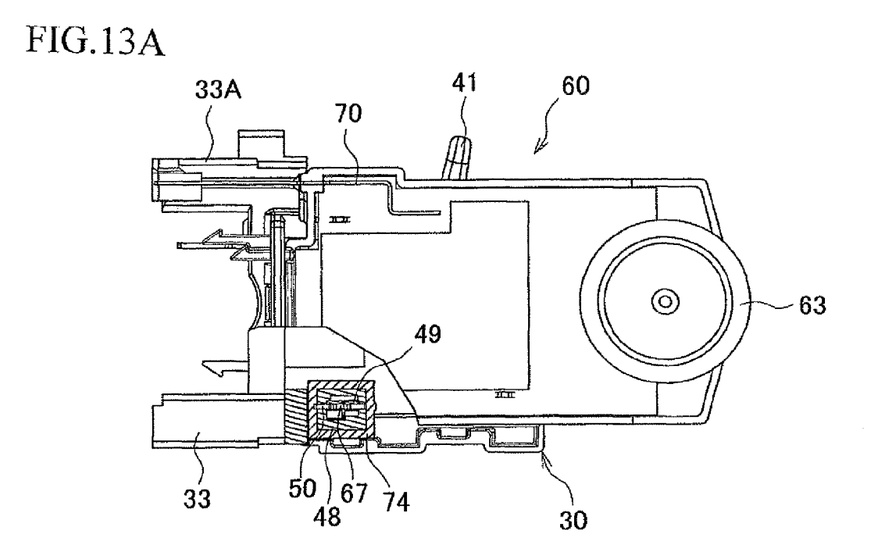
FIG. 13A is a plane view and FIG. 13B is a side view.
Figure 13B:
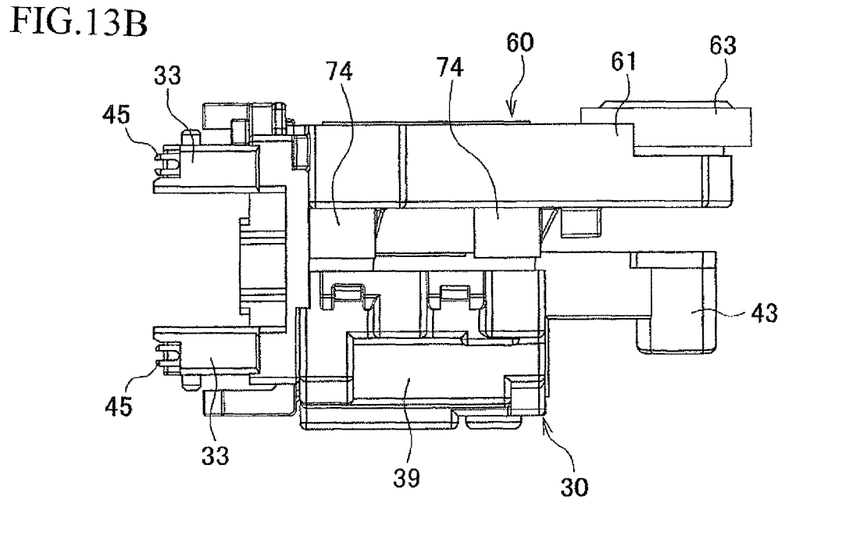

According to this modification, as shown in FIG. 12, each closing portion 74 of the controller 60 faces opposite the corresponding connection portion 48 of the switch block 30. In this state, when the controller 60 is assembled in the vertical direction to the switch block 30, high dust resistance can be obtained because the periphery of each connection portion 48 is covered by the corresponding closing portion 74 as shown in FIGS. 13A and 13B.

Further, although the female terminals are provided on the switch block and the male terminals are provided on the controller in the embodiment and modifications described above, these terminals including the connection portions and the closing portions may be provided in a reverse configuration.

In addition, the screw mounting boss that passes between the switch block and the controller may be omitted, and the positions and sizes of the connection portions, the receiving projection, and the rail projections may also be modified.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A grinder comprising:
    a cylindrical housing that accommodates a motor;
    a switch block that is assembled to a rear portion of the housing, and includes a switch that turns driving of the motor on and off;
    a controller that is assembled to the switch block, and includes a control circuit of the motor;
    a male terminal that is projectingly provided on one assembling surface of one of the switch block and the controller;

a connection portion that is projectingly provided on the other assembling surface of the switch block and the controller, and accommodates a female terminal and includes an entry opening of the male terminal, wherein at the time of assembling of the switch block and the controller, the male terminal that enters from the entry opening is inserted into and connected to the female terminal; and a closing portion that is formed on the one assembling surface, and covers at least a formation surface of the entry opening of the connection portion with the male terminal in an inserted and connected state;

wherein the male terminal, the female terminal, and the connection portion are configured to prevent particulate contamination.

2. The grinder according to claim 1, wherein
the controller is provided with a controller terminal that is electrically connected to the motor side through the switch block, and the switch block is provided with a positioning portion that positions the controller terminal at a position of connection with the motor side at the time of assembling of the controller.

3. The grinder according to claim 2, wherein
the positioning portion is formed as a cylinder through which the controller terminal runs.

4. The grinder according to claim 1, wherein
the housing is formed with a holding portion that suppresses detachment of the switch from the switch block by contacting an outer surface of the switch at the time of assembling of the switch block.

5. The grinder according to claim 4, wherein
the holding portion is a plate-shaped rib that contacts along the outer surface of the switch.

6. The grinder according to claim 1, wherein
the closing portion is a projection that is provided adjacent to the male terminal, and fits to a recessed portion that is provided recessed on the formation surface of the entry opening.

7. The grinder according to claim 6, wherein
the switch block and the controller are assembled by sliding the assembling surface of the controller in parallel from behind to a position opposing the assembling surface of the switch block,
the male terminal is a terminal plate that is projectingly provided parallel to a direction of the sliding, and
the entry opening of the connection portion is a slit into which the terminal plate enters while sliding, and formed spanning over two surfaces comprising a surface orthogonal to the other assembling surface of the connection portion and a surface parallel to the other assembling surface, with the recessed portion formed spanning over the two surfaces.

8. The grinder according to claim 7, wherein
the projection is a first projection that fits to a portion of the recessed portion on the orthogonal surface side, and a second projection that is provided at a base of the terminal plate and fits to a portion of the recessed portion on the parallel surface side.

9. The grinder according to claim 8, wherein
a pair of reverse L-shaped rail projections having an outward-facing engagement side is projectingly provided on the one assembling surface, and a pair of L-shaped engagement projections that respectively engage with the rail projections in an assembled state of the switch block and the controller is projectingly provided on the other assembling surface.

10. The grinder according to claim 7, wherein
a pair of reverse L-shaped rail projections having an outward-facing engagement side is projectingly provided on the one assembling surface, and a pair of L-shaped engagement projections that respectively engage with the rail projections in an assembled state of the switch block and the controller is projectingly provided on the other assembling surface.

11. The grinder according to claim 1, wherein
the controller is provided with a hook that engages with an engagement hole that is provided on the switch block in a state where the controller is assembled to the switch block.

12. The grinder according to claim 11, wherein
the controller is provided with a fitting projection that fits into a fitting hole that is provided on the switch block in a state where the controller is assembled to the switch block.

13. The grinder according to claim 1, wherein
a stator of the motor is formed with a front insertion portion that faces rearward and accommodates a coil-side terminal that is connected to a coil,
the housing is formed with a cylindrical member into which the front insertion portion is inserted with the motor in an accommodated state, and
the switch block is formed with a rear insertion portion that accommodates a switch-side terminal that corresponds to the coil-side terminal, with the rear insertion portion inserted into the cylindrical member in a state where the switch block is assembled to a rear portion of the housing so as to electrically connect the switch-side terminal to the coil-side terminal.

14. The grinder according to claim 1, wherein
the switch block is provided with a receiving seat that fixes a power cord.

15. The grinder according to claim 1, wherein
the switch block and the controller are assembled by sliding the assembling surface of the controller in parallel from behind to a position opposing the assembling surface of the switch block,
the male terminal is a terminal plate that is projectingly provided parallel to a direction of the sliding, and
the closing portion is formed from a first plate that is provided orthogonally adjacent to the terminal plate and contacts an entry surface for the terminal plate on the connection portion, and a pair of second plates that is provided orthogonally continuous from both ends of the first plate and contacts both side surfaces adjacent to the entry surface on the connection portion.

16. The grinder according to claim 1, wherein
the switch block and the controller are assembled by translating one of the assembling surfaces of the switch block and the controller from mutually opposing positions of the assembling surfaces to the other assembling surface,
the male terminal is a terminal plate that is projectingly provided parallel to a direction of the translating, and
the closing portion is a cylinder that is provided on a periphery of the terminal plate, and externally fits to the connection portion with the switch block and the controller in an assembled state so as to cover a periphery of the connection portion.

* * * * *